United States Patent
Sharon et al.

(10) Patent No.: US 12,451,904 B1
(45) Date of Patent: Oct. 21, 2025

(54) DATA STORAGE DEVICE WITH JOINT ERROR CORRECTION CODE ENGINES

(71) Applicant: Sandisk Technologies, Inc., Milpitas, CA (US)

(72) Inventors: Eran Sharon, Rishon Lezion (IL); Alexander Bazarsky, Holon (IL); Ran Zamir, Ramat Gan (IL)

(73) Assignee: Sandisk Technologies, Inc., Milpitas, CA (US)

(*) Notice: Subject to any disclaimer, the term of this patent is extended or adjusted under 35 U.S.C. 154(b) by 0 days.

(21) Appl. No.: 18/635,867

(22) Filed: Apr. 15, 2024

(51) Int. Cl.
*H03M 13/11* (2006.01)
*H03M 13/29* (2006.01)

(52) U.S. Cl.
CPC .... *H03M 13/1111* (2013.01); *H03M 13/2942* (2013.01)

(58) Field of Classification Search
None
See application file for complete search history.

(56) References Cited

U.S. PATENT DOCUMENTS

| 7,559,008 B1 * | 7/2009 | Patapoutian ...... H03M 13/3972 714/800 |
| 9,268,635 B2 | 2/2016 | Sharon et al. |
| 9,940,194 B2 | 4/2018 | Achtenberg et al. |
| 10,536,172 B2 | 1/2020 | Ilani et al. |
| 2017/0271029 A1 * | 9/2017 | Wang .................... G11C 29/42 |

FOREIGN PATENT DOCUMENTS

| WO | WO-2012117263 A1 * | 9/2012 | .......... G06F 11/1076 |
| WO | WO-2014031050 A1 * | 2/2014 | ............. H04L 1/208 |

* cited by examiner

Primary Examiner — Guerrier Merant
(74) Attorney, Agent, or Firm — Michael Best & Friedrich LLP

(57) ABSTRACT

Examples described herein provide a joint LDPC and XOR (JLX) error correction scheme that utilizes parity of the LDPC code to correct errors in XOR stripes of data, allowing improved protection against error. For example, when decoding of a codeword fails, an XOR operation is performed on the other codewords within the same XOR stripe to generate a copy of the failed codeword. The copy of the failed codeword is used as a soft bit input to an LDPC decoder, providing a sense of where errors in the failed codeword may be situated. The LDPC decoder may then recover the failed codeword. The scrambling seed used for encoding pages of data may also be used for recovering from error in a JLX ECC operation.

20 Claims, 20 Drawing Sheets

JLX Recovery sequence for codeword j
================================================

Let M denote the size of the stripe, N denote the codeword size, K denote the payload size.
$X\_D = \underline{o}^K$ = 1xK zero vector;
$X\_C = \underline{o}^K$ = 1xN zero vector;
T = 0;                              // counter of the number of additional failing codewords within the stripe (except codeword j)

For i = 1:M, i ≠ j (traverse all other codewords i within the XOR strip except codeword j)
 [Data_i, Success_i] = Decode(Noisy_Codeword_i);
 If Success_i = 1;                  //Decoding was successful
  -X_D=XOr(X_D, Data_i);
  -Sr = Seed_i[31: 16;              //Needs to be done only once (e.g. for the first successfully decoded codeword)
 Else:                              //Decoding failed
  -X_C=XOR(X_C, Noisy_Codeword_i);
  -C = Encode($\underline{o}^K$, Seed = [Sr, Sdj+Srj]);
  -X_C = XOR (X_C, C);
  - t = t + 1;

If t = 0:
 -Data_j + X_D;                     //conventional XOR recovery
Else
 -C = Encode(X_D, Seed = [Sr, Sdj+Srj]);
 -X_C = XOR (X_C, C);
 - [Data_j, Success_j] = Decode(HB_pointer + SB1, SB2_pointer = X_C, LLR_Table=func(t), Decode mode = FP, SOF disabled, MMD disabled);

FIG. 9

- Let $1' = Ones(1,r) = [1\ 1\ \ldots\ 1]$
- Let $0' = Zeros(1,r) = [0\ 0\ \ldots\ 0]$
- Let $D$ denote the $1 \times K$ data vector
- Let $P_s$ denote the $1 \times K$ data scrambling pattern corresponding to Seed $= S$
- Let $C = [D+P_s\ S\ NOT\ (crc)\ pary]$ denote the $1 \times N$ codeword vector (for Polaris 3 LDPC)
- Let $Gc$ denote the $(K+32) \times (K+64)$ CRC generator matrix
  - CRC encoding for Polaris3 LDPC. $[D+P_s\ S\ NOT\ (crc)] = [D+P_s\ S] * Gc + [\underline{0}^{K+32}\ \underline{1}^{32}]$
- Let $Ge$ denote the $(K+64) \times N$ LDPC parity generator matrix
  - $C = [D+P_s\ s\ NOT(crc)]*Ge = [[D+P_s\ S]*Gc + [\underline{0}^{K+32}\ \underline{1}^{32}]]*Ge = [D\underline{0}^{32}]*Gc*Ge + [P_s\ S]*Gc*Ge + [\underline{0}^{K+32}\ \underline{1}^{32}]*Ge$ Assume that we are trying to recover codeword $j$. Assume that within the other codewords there is one failure in codeword $m$, while all other codewords succeeded
(→ $t = 1$, extension to other $t$ values is straightforward).
Then:
$X\_C = Encode(X\_D,\ Seed = Sj) + Noisy\_Codeword\_m + Encode(\underline{0}^K,\ Seed = Sm) =$
$[XOR(D\_j, i \neq j,m)\underline{0}^{32}]*Gc*Ge + [P_{Sj}\ Sj]*Gc*Ge + [\underline{0}^{K+32}\ \underline{1}^{32}]*Ge + [D\_m\ \underline{0}^{32}]*Gc*Ge + [P_{Sm}\ Sm]*Gc*Ge + [\underline{0}^{K+32}\ \underline{1}^{32}]*Ge + Noise\_m +$
$[XOR(D\_i, i \neq j)\ \underline{0}^{32}]*Gc*Ge + [P_{Sj}\ Sj]*Gc*Ge + [\underline{0}^{K+32}\ \underline{1}^{32}]*Ge + Noise\_m =$
$(D\_j, \underline{0}^{32})*Gc*Ge + Noise\_m =$
$C\_j + Noise\_m$

FIG. 10

Let M denote the size of the stripe, N denote the codeword size, K denote the payload size.
X_D = 0^K = 1xK zero vector;
X_C = 0^N = 1xN zero vector;
t = 0;                                    // counter of the number of additional failing codewords within the stripe (except codeword k)

For i = 1:m, i ≠ k (Traverse all other codewords i within the XOR strip except codeword k)
    [Data_i, Success_i] = Decode (Noisy_Codeword_i);
    If Success_i = 1;                     // Decoding was successful
        -X_D = XOR(X_D, Data_i);
    Else:                                 // Decoding failed
        -X_C = XOR(X_C, Noisy_Codeword_i);
        -t = t + 1;

If t = 0:
    -Data_k = X_D;                        //conventional XOR recovery
Else if t is Odd:
    -C = Encode(X_D, Seed = 0);
    -X_C = XOR(X_C, C);
    -P = Encode(0^K, Seed = 0);
    -X_C = XOR(X_C, P);
    -[Data_k, Success_k] = Decode(HB_pointer = HB, SB1_pointer = SB1, SB2_pointer = X_C, LLR_Table = func(t), Decode mode = FP, SOF disabled, MMD disabled);
Else if t is Even:
    -s = Seed associated with the stripe;  // may be recovered from one of the successfully decoded FMUs or derived deterministically
    -C = Encode(X_D, Seed = s);
    -X_C = XOR (X_C, C);
    -[Data_k, Success_k] = Decode(HB_pointer = HB, SB1_pointer = SB1, SB2_pointer = X_C, LLR_Table = func(t), Decode mode = FP, SOF disabled, MMD disabled);

FIG. 13

Let $\underline{1}^r$ = Ones(1, r) = [1 1 ... 1]
Let $\underline{0}^r$ = Zeros(1, r) = [0 0 ... 0]
Let D denote the 1xK data vector
Let Ps denote the 1xK data scrambling pattern corresponding to Seed = s (which is fixed across the entire stripe)
Let C = [D s crc parity] denote the 1xN codeword vector
Let Gc denote the (K+32)x(K+64) CRC generator matrix
CRC encoding for FM1:             [D+Ps s crc] = [D+Ps s] * Gc
CRC encoding for FMHP:            [D+Ps s NOTcrc] = [D+Ps s] * Gc + [$\underline{0}^{K+32}$ $\underline{1}^{32}$]
Let Ge denote the (K+64)xN LDPC parity generator matrix
C_FM1 = [D+Ps s crc]*Ge = [D+Ps s]*Gc*Ge + [PS s]*Gc*Ge
C_FMHP = [D+Ps s NOTcrc]*Ge = [[D+Ps s]*Gc + [$\underline{0}^{K+32}$ $\underline{1}^{32}$]]*Ge = [D+Ps s]*Gc*Ge + [PS s]*Gc*Ge + [$\underline{0}^{K+32}$ $\underline{1}^{32}$]*Ge Assume that we are trying to recover codeword k. Assume that within the other codewords there is one failure in codeword m, while all other codewords succeeded (t = 1, extension to other odd t is straightforward).
Then:
X_C = Encode(X_D, Seed = 0) + Encode($\underline{0}^K$, Seed = 0) + Noisy_Codeword_m =
[XOR(D_i, i≠k,m)$\underline{0}^{32}$]*Gc*Ge + [$\underline{0}^{K+32}$ $\underline{1}^{32}$]*Gc*Ge + [D_m $\underline{0}^{32}$]*Gc*Ge + [$\underline{0}^{K+32}$ $\underline{1}^{32}$]*Gc*Ge + Noise_m =
[XOR(D_i, i≠k,m)$\underline{0}^{32}$]*Gc*Ge + [Ps s]*Gc*Ge + [$\underline{0}^{K+32}$ $\underline{1}^{32}$]*Ge + Noise_m =
[D_k $\underline{0}^{32}$]*Gc*Ge + [Ps s]*Gc*Ge + Noise_m =
C_k + Noise_m

FIG. 14A

Let $\underline{1}^r$ = Ones(1, r) = [1 1 .... 1]
Let $\underline{0}^r$ = Zeros(1, r) = [0 0 .... 0]
Let D denote the 1XK data vector
Let Ps denote the 1xK data scrambling pattern corresponding to Seed = s (which is fixed across the entire stripe)
Let C = [D s crc parity] denote the 1XN codeword vector
Let Gc denote the (K+32)x(K+64) CRC generator matrix
CRC encoding for FM1:              [D+Ps s crc] = [D+Ps s] * Gc
CRC encoding for FMHP:             [D+Ps s NOTcrc] = [D+Ps s] * Gc + [$\underline{0}^{K+32}$ $\underline{1}^{32}$]
Let Ge denote the (K+64)xN LDPC parity generator matrix
C_FM1 = [D+Ps s crc]*Ge = [D+Ps s]*Gc*Ge = [D $\underline{0}^{32}$]*Gc*Ge + [PS s]*Gc*Ge
C_FMHP = [D+Ps s NOTcrc]*Ge = [[D+Ps s]* Gc + [$\underline{0}^{K+32}$ $\underline{1}^{32}$]]*Ge = [D $\underline{0}^{32}$]*Gc*Ge + [PS s]*Gc*Ge + [$\underline{0}^{K+32}$ $\underline{1}^{32}$]*Ge Assume that we are trying to recover codeword k. Assume that within the other codewords there are two failure in codeword m & j, while all other codewords succeeded (t = 2, extension to other even t is straightforward).
Then:
X_C = Encode(X_D, Seed = s) + Noisy_Codeword_m + Noisy_Codeword_j =
[XOR(D_j, i≠k,m,j)$\underline{0}^{32}$]*Gc*Ge + [Ps s]*Gc*Ge + [$\underline{0}^{K+32}$ $\underline{1}^{32}$]*Ge + [D_m $\underline{0}^{32}$]*Gc*Ge + [Ps s]*Gc*Ge + [$\underline{0}^{K+32}$ $\underline{1}^{32}$]*Ge + Noise_m
+ [D_j $\underline{0}^{32}$]*Gc*Ge + [Ps s]*Gc*Ge + [$\underline{0}^{K+32}$ $\underline{1}^{32}$]*Ge + Noise_j =
[XOR(D_i, i≠k)$\underline{0}^{32}$]*Gc*Ge + [Ps s]*Gc*Ge + [$\underline{0}^{K+32}$ $\underline{1}^{32}$]*Ge + Noise_m + Noise_j =
[D_k $\underline{0}^{32}$]*Gc*Ge + [Ps s]*Gc*Ge + [$\underline{0}^{K+32}$ $\underline{1}^{32}$]*Ge + Noise_m + Noise_j =
C_k + Noise_m + Noise_j

FIG. 14B

DATA STORAGE DEVICE WITH JOINT ERROR CORRECTION CODE ENGINES

FIELD

This application relates generally to data storage devices, and more particularly, to data storage devices with joint low-density parity check and exclusive-or engines.

SUMMARY

Solid State Device (SSD) architectures may support Error Correction Code (ECC) engines that perform scrambling, encoding, and decoding operations for device read and write operations. The ECC engines may include Low Density Party Check (LDPC) engines for correcting random errors that occur during reading and writing of data to memory. Additionally, the SSD storage controllers may include exclusive-or (XOR) engines for correcting data errors due to memory defects, such as a broken wordline or page.

Traditionally, LDPC and XOR operations are separate operations that are performed based on the type of errors experienced by read (e.g., decoded) data. However, when multiple pages of data experience errors, a large amount of processing power is needed to successfully decode the pages. Embodiments described herein provide a joint LDPC and XOR (also referred to herein as "JLX") error correction scheme that utilizes parity of the LDPC code to correct errors in XOR stripes of data, allowing improved protection against errors. For example, when decoding of more than one codeword within an XOR stripe fails, an XOR operation is performed on the other codewords within the same XOR stripe to generate a copy of the failed codeword. The copy of the failed codeword is used as a soft bit input to an LDPC decoder, providing a sense of where errors in the failed codeword may be situated. The LDPC decoder may then recover the failed codeword.

In some implementations, scrambling is used in data storage devices to avoid data dependent disturb effects (such as Back Propagation and program disturbs) that may be caused by having repetitive data patterns, and avoids having correlated data between adjacent physical storage devices. The scrambling seed used for encoding pages of data may also be used for recovering from error in a JLX ECC operation.

The disclosure provides a data storage controller comprising a memory for storing a plurality of codewords and a data storage device controller coupled to the memory, the controller including a processor and a controller memory. The controller memory stores a set of instructions that, when executed by the processor, instruct the controller to detect, during decoding of the plurality of codewords, at least two failed codewords that failed to be decoded, perform a joint low density parity check and exclusive-or (JLX) operation using scrambling seeds associated with the at least two failed codewords, and recover at least one of the two failed codewords from the JLX operation.

The disclosure also provides a method comprising detecting, during decoding of a plurality of codewords and by a storage controller executing decoding firmware, at least two failed codewords that failed to be decoded, performing, with the storage controller, a joint low density parity check and exclusive-or (JLX) operation using scrambling seeds associated with the at least two failed codewords, and recovering, with the storage controller, at least one of the two failed codewords from the JLX operation.

The disclosure also provides a memory device. The memory device includes a memory for storing a plurality of codewords, and a controller coupled to the memory, the controller configured to perform a joint low density parity check and exclusive-or (JLX) operation using a scrambling seed associated with a failed codeword of the plurality of codewords, to recover the failed codeword when at least two codewords of the plurality of codewords fail during decoding.

Various aspects of the present disclosure provide for improvements of data storage devices. The present disclosure can be embodied in various forms, including hardware or circuits controlled by software, firmware, or a combination thereof. The foregoing summary is intended solely to give a general idea of various aspects of the present disclosure and does not limit the scope of the present disclosure in any way.

BRIEF DESCRIPTION OF THE DRAWINGS

FIG. 9 is example pseudocode for performing the methods of FIGS. 5 and 7, in accordance with some embodiments of the disclosure.

FIG. 10 is an example mathematical proof for the JLX ECC Scheme, in accordance with some embodiments of the disclosure.

FIG. 13 is example pseudocode for performing the methods of FIGS. 11 and 12, in accordance with some embodiments of the disclosure.

FIGS. 14A-14B are another example mathematical proof for the JLX ECC Scheme, in accordance with some embodiments of the disclosure.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the data storage controller can be performed by hardware (for example, analog or digital circuits), a combination of hardware and software (for example, program code or firmware stored in a non-transitory computer-readable medium that is executed by a processor or control circuitry), or any other suitable means. The following description is intended solely to give a general idea of various aspects of the present disclosure and does not limit the scope of the disclosure in any way. Furthermore, it will be apparent to those of skill in the art that, although the present disclosure refers to NAND flash, the concepts discussed herein are applicable to other types of solid-state memory, such as NOR, PCM ("Phase Change Memory"), ReRAM, MRAM, etc.

Data Storage Devices

Figure 1:
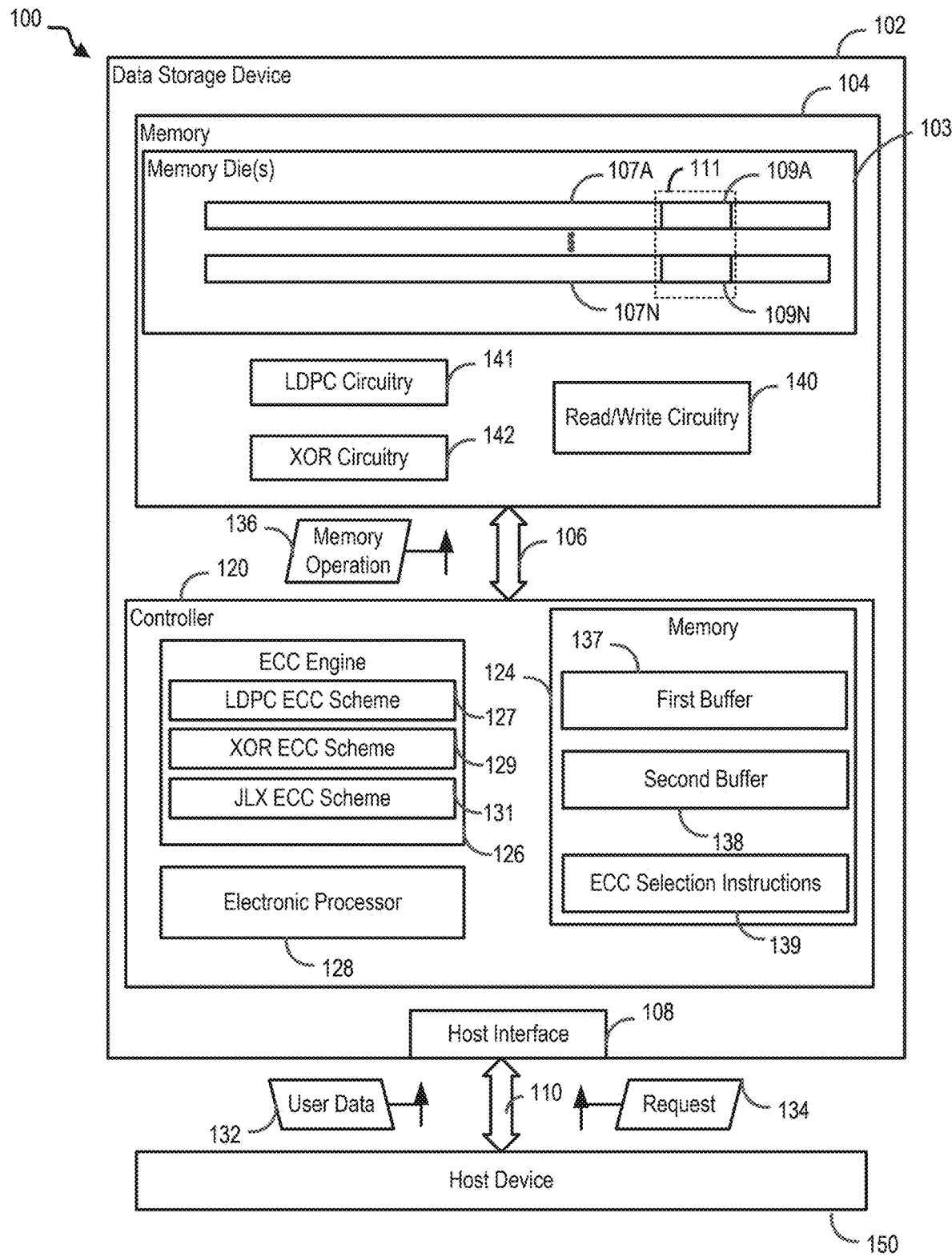
FIG. 1 is a block diagram of a system including a data storage device and a host device, in accordance with some embodiments of the disclosure.

FIG. 1 is a block diagram of a system including a data storage device and a host device, in accordance with some embodiments of the disclosure. In the example of FIG. 1, the system 100 includes a data storage device 102 and a host device 150. The data storage device 102 includes a controller 120 (referred to hereinafter as "data storage device controller") and a memory 104 (e.g., non-volatile memory) that is coupled to the data storage device controller 120.

One example of the structural and functional features provided by the data storage device controller 120 are illustrated in FIG. 1 in a simplified form. The data storage device controller 120 may also include additional modules or components other than those specifically illustrated in FIG. 1. Additionally, although the data storage device 102 is illustrated in FIG. 1 as including the data storage device controller 120, in other implementations, the data storage device controller 120 is instead located separate from the data storage device 102. As a result, operations that would normally be performed by the data storage device controller 120 described herein may be performed by another device that connects to the data storage device 102.

The data storage device 102 and the host device 150 may be operationally coupled by a connection (e.g., a communication path 110), such as a bus or a wireless connection. In some examples, the data storage device 102 may be embedded within the host device 150. Alternatively, in other examples, the data storage device 102 may be removable from the host device 150 (i.e., "removably" coupled to the host device 150). As an example, the data storage device 102 may be removably coupled to the host device 150 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, or a cloud storage drive, or other suitable storage drives.

The data storage device 102 may be configured to be coupled to the host device 150 by the communication path 110, such as a wired communication path and/or a wireless communication path. For example, the data storage device 102 may include an interface 108 (e.g., a host interface) that enables communication by the communication path 110 between the data storage device 102 and the host device 150, such as when the interface 108 is communicatively coupled to the host device 150.

The host device 150 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 150 may issue one or more commands to the data storage device 102, such as one or more requests to erase data at, read data from, or write data to the memory 104 of the data storage device 102. For example, the host device 150 may be configured to provide data, such as user data 132, to be stored at the memory 104, or to request data, by request 134, to be read from the memory 104. The host device 150 may include a mobile smartphone, a music player, a video player, a gaming console, an electronic book reader, a personal digital assistant (PDA), a computer, such as a laptop computer or notebook computer, any combination thereof, or other suitable electronic device.

In some examples, the host device 150 may operate in compliance with other specifications, such as a Universal Flash Storage (UFS) Host Controller Interface specification, a Universal Serial Bus specification, or other suitable industry specification. The host device 150 may also communicate with the memory 104 in accordance with any other suitable communication protocol.

The memory 104 of the data storage device 102 may include a non-volatile memory (e.g., NAND, 3D NAND family of memories, or other suitable memory). In some examples, the memory 104 may be any type of flash memory. For example, the memory 104 may be two-dimensional (2D) memory or three-dimensional (3D) flash memory. The memory 104 may include one or more memory dies 103. Each of the one or more memory dies 103 may include one or more blocks (e.g., one or more erase blocks). Each block may include one or more groups of storage elements, such as a representative group of storage elements 107A-107N. The group of storage elements 107A-107N may be configured as a codeword, word line or page of data. The group of storage elements 107 may include multiple storage elements, such as a representative storage elements 109A and 109N, respectively. Each representative storage element 109 may include, for example, one bit of data. Portions of the group of storage elements 107 may be grouped with portions of one or more other codewords to form a stripe codeword 111. For example, the stripe codeword 111 may be a vertical bit line of the representative storage elements 109.

The memory 104 may include support circuitry, such as read/write circuitry 140, LDPC circuitry 141, and XOR circuitry 142 to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104.

Alternatively, one or more individual memory dies may include corresponding read/write circuitry that is operable to read from and/or write to storage elements within the individual memory die independent of any other read and/or write operations at any of the other memory dies.

The data storage device 102 includes the data storage device controller 120 coupled to the memory 104 (e.g., the one or more memory dies 103) by a bus 106, an interface (e.g., interface circuitry), another structure, or a combination thereof. For example, the bus 106 may include multiple distinct channels to enable the data storage device controller 120 to communicate with each of the one or more memory dies 103 in parallel with, and independently of, communication with the other memory dies 103. In some implementations, the memory 104 may be a flash memory.

The data storage device controller 120 is configured to receive data and instructions from the host device 150 and to send data to the host device 150. For example, the data storage device controller 120 may send data to the host device 150 by the interface 108, and the data storage device controller 120 may receive data from the host device 150 by the interface 108. The data storage device controller 120 is configured to send data and commands (e.g., the memory operation 136) to the memory 104 and to receive data from the memory 104. For example, the data storage device controller 120 is configured to send data and a write command to cause the memory 104 to store data to a specified address of the memory 104. The write command may specify a physical address of a portion of the memory 104 (e.g., a physical address of a word line of the memory 104) that is to store the data.

The data storage device controller 120 is configured to send a read command to the memory 104 to access data from a specified address of the memory 104. The read command may specify the physical address of a region of the memory 104 (e.g., a physical address of a word line of the memory 104). The data storage device controller 120 may also be configured to send data and commands to the memory 104 associated with background scanning operations, garbage collection operations, and/or wear-leveling operations, or other suitable memory operations.

The data storage device controller 120 may include a memory 124 (for example, a random access memory ("RAM"), a read-only memory ("ROM"), a non-transitory computer readable medium, or a combination thereof), an error correction code (ECC) engine 126, and an electronic processor 128 (for example, a microprocessor, a microcontroller, a field-programmable gate array ("FPGA") semiconductor, an application specific integrated circuit ("ASIC"), or another suitable programmable device). The memory 124 stores data and/or instructions that may be executable by the electronic processor 128. For example, the memory 124 stores a first buffer 137, a second buffer 138, and ECC selection instructions 139 that is executable by the electronic processor 128. In some instances, the first buffer 137, the second buffer 138, and the ECC selection instructions 139 are stored permanently in the memory 124. In other instances, at least the ECC selection instructions 139 are received from the host device 150. The first buffer 137 and the second buffer 138 may store one or more pages during an XOR recovery operation, as described below in more detail.

Additionally, although the data storage device controller 120 is illustrated in FIG. 1 as including the memory 124, in other implementations, some or all of the memory 124 is instead located separate from the data storage device controller 120 and executable by the electronic processor 128 or a different electronic processor that is external to the data storage device controller 120 and/or the data storage device 102. For example, the memory 124 may be dynamic random-access memory (DRAM) that is separate and distinct from the data storage device controller 120. As a result, operations that would normally be performed solely by the data storage device controller 120 described herein may be performed by the following: 1) the electronic processor 128 and different memory that is internal to the data storage device 102, 2) the electronic processor 128 and different memory that is external to the data storage device 102, 3) a different electronic processor that is external to the data storage device controller 120 and in communication with memory of the data storage device 102, and 4) a different electronic processor that is external to the data storage device controller 120 and in communication with memory that is external to the data storage device 102.

The data storage device controller 120 may send the memory operation 136 (e.g., a read command) to the memory 104 to cause the read/write circuitry 140 to sense data stored in a storage element. For example, the data storage device controller 120 may send the read command to the memory 104 in response to receiving a request for read access from the host device 150.

The ECC engine 126 is configured to encode and decode data according to a LDPC ECC Scheme 127, a XOR ECC Scheme 129, and a JLX ECC Scheme 131. During decoding of data from the memory 104, the data storage device controller 120 implements the LDPC ECC Scheme 127 and the XOR ECC Scheme 129 to correct errors within the data. However, if more than one page of data includes errors (as determined by the electronic processor 128 implementing the ECC selection instructions 139), the data storage device controller 120 implements the JLX ECC Scheme 131, described below in more detail. Further details regarding example XOR ECC Schemes 129 and stripe codewords 111 can be found in U.S. Pat. No. 10,536,172, "ECC and Raid-Type Decoding", incorporated herein in its entirety.

Error Correction Schemes

Figure 2:
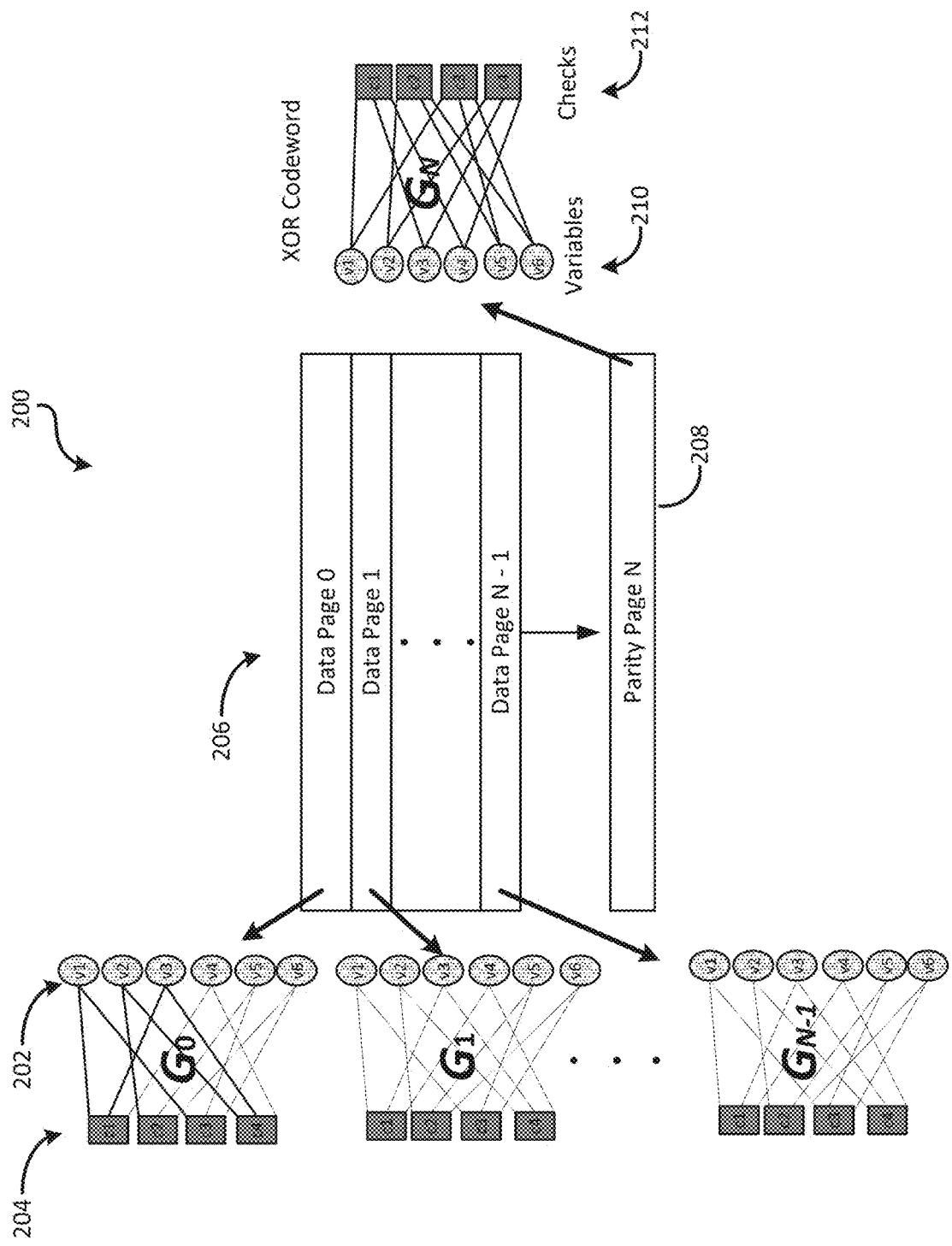
FIGS. 2-3 illustrates an example for correcting errors within a plurality of data pages using an XOR operation, in accordance with some embodiments of the disclosure.

FIG. 2 illustrates an example 200 for correcting errors within a plurality of data pages 206. In the example 200, an XOR operation is performed on the plurality of data pages 206 to generate a parity page 208. Each data page 206 is associated with a graph (or codeword) $G_N$ and variable nodes (v1, v2, v3, v4, v5, v6) 202 that represent the bits stored in each data page 206. The variable nodes 202 are coupled to check nodes 204, labeled C1, C2, C3, and C4, which represent parity bits used for the LDPC ECC Scheme 127 when detecting and correcting errors in the plurality of data pages 206. Generating the parity page 208 results in XOR variable nodes 210 that represent the bits forming the parity page 208. XOR check nodes 212 are also generated for LDPC error correction of the parity page 208.

Figure 3:
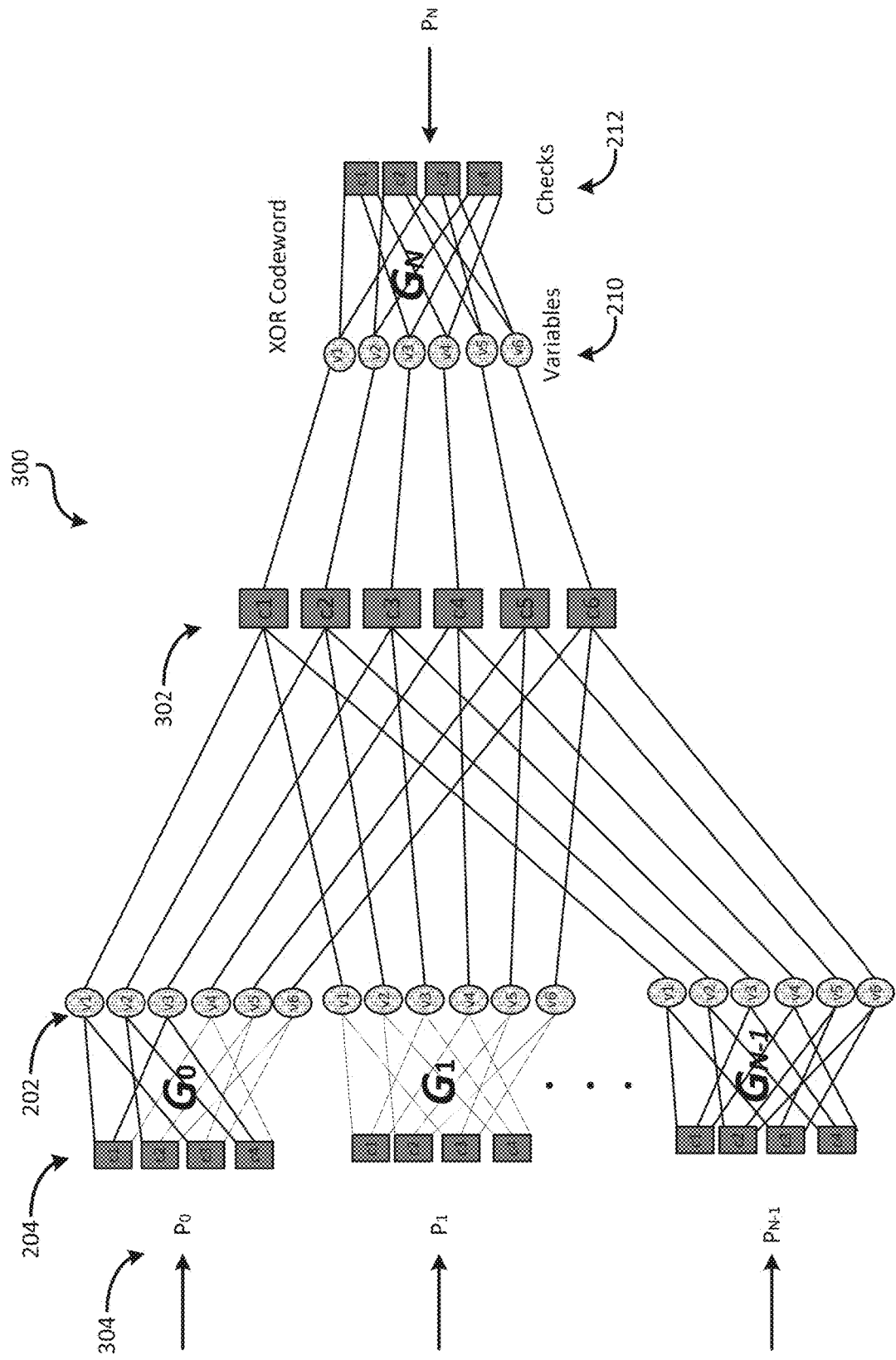

The XOR variable nodes 210 that result from the XOR operation of the plurality of data pages 206 may also be referred to for a parity check, as shown in example 300 of FIG. 3. In example 300, the graph $G_N$ is populated based on the codeword information $P_0$ 304, such as hard bit and soft bit data received from the memory 104 upon reading a codeword. The variable nodes of each of the graphs $G_N$ are coupled to corresponding check nodes 302, indicating the XOR check of the XOR ECC Scheme 129.

While the use of both the LDPC ECC Scheme 127 and the XOR ECC Scheme 129 provide for correcting both random errors and memory errors, the LDPC ECC Scheme 127 and the XOR ECC Scheme 129 utilize a large amount of processing data that results in slow correction performance on some devices, particularly in situations with errors in multiple data pages. Accordingly, embodiments described herein provide for a JLX error correction operation (e.g., the JLX ECC Scheme 131) that efficiently combines the LDPC ECC Scheme 127 and the XOR ECC Scheme 129 for correcting multiple data pages having errors.

Figure 4:
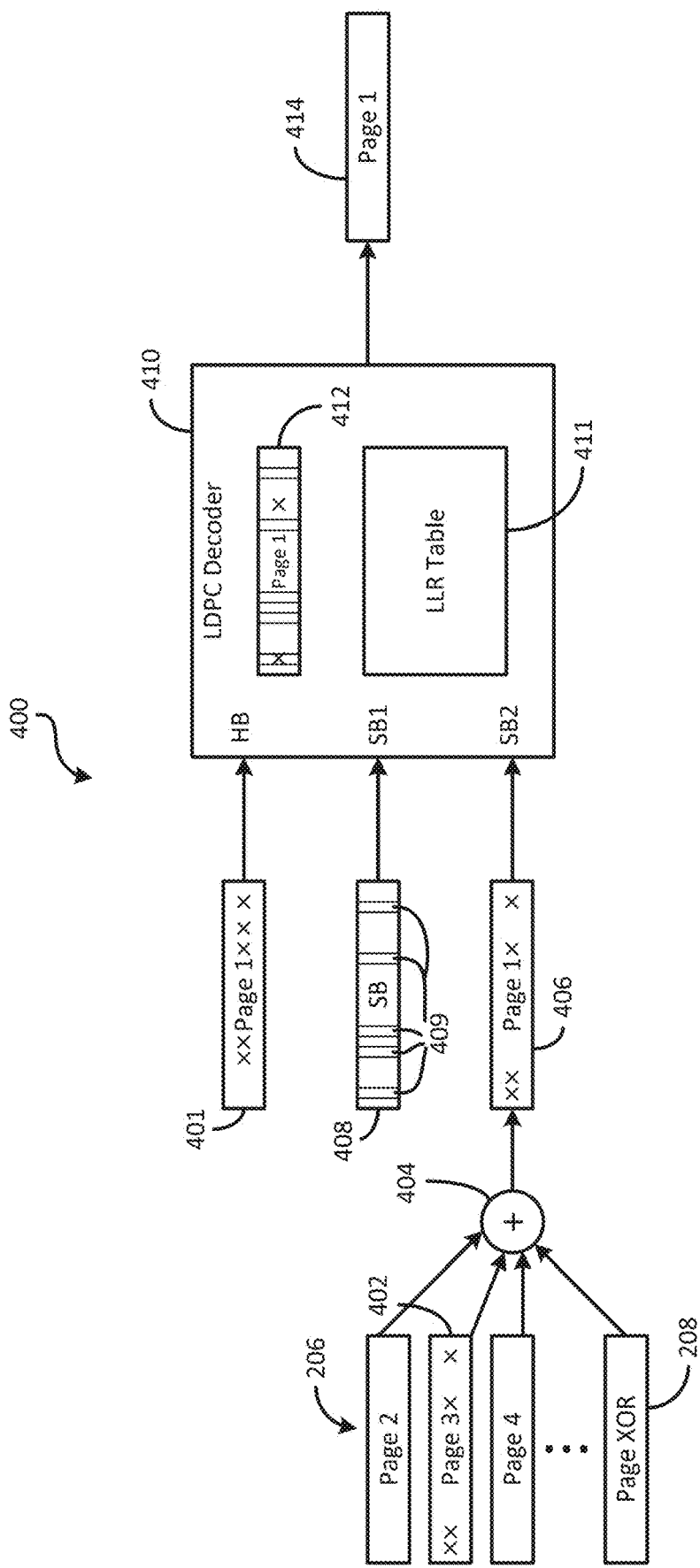
FIG. 4 illustrates an example process for correcting errors in a page using an example JLX ECC Scheme, in accordance with some embodiments of the disclosure.

FIG. 4 illustrates an example process 400 for correcting errors in a page using an example JLX ECC Scheme 131. In the example process 400, a first page 401 (e.g., page 1) includes errors to be corrected by the ECC engine 126 following failure of the LDPC ECC Scheme 127 to decode the first page 401. First, an XOR operation is performed on the plurality of data pages 206 and the parity page 208 at node 404 to generate a copy page 406. The plurality of data pages 206 and the parity page 208 may be in the same XOR stripe as the first page 401. However, a third page 402 (e.g., page 3) also includes multiple errors. Accordingly, the copy page 406 includes the errors in the same locations as the third page 402 (e.g., the same variable nodes 202 of FIGS. 2-3).

In the example of process 400, the first page 401 and the third page 402 (and therefore, the copy page 406) include errors in different locations. Soft bit data may be utilized to identify where the errors in the first page 401 and the third page 402 may be located. The process 400 includes a soft bit page 408 associated with the soft bits of the first page 401. Specifically, the soft bit page 408 includes a plurality of cells 409 that are unreliable cells prone to more error. In this manner, the memory cells storing data of the first page 401 that are more prone to errors are known.

The first page 401, the copy page 406, and the soft bit page 408 are provided to an LDPC decoder 410, with the copy page 406 being provided as a second soft bit input. The LDPC decoder 410 may be, for example, the LDPC circuitry 141 performing operations indicated by the LDPC ECC Scheme 127. The LDPC decoder 410 copies the reliable bits from the first page 401 and copies the unreliable bits from the copy page 406, as indicated by the soft bit page 408, to generate a recreated first page 412. As the unreliable cells are copied from the copy page 406, the recreated first page 412 has a lower error rate than the first page 401 and is corrected by the LDPC decoder 410 to generate a corrected first page 414.

In some implementations, during encoding of data to the memory 104, the controller 120 scrambles the data to avoid data dependent disturb effects (such as Back Propagation, program disturbs, NWI, etc.) that may be caused by having repetitive data patterns. Additionally, the controller 120 may scramble the data to avoid having correlated data between adjacent physical storage elements (e.g., adjacent pages, wordlines, and strings). Scrambling ensures that data is random and uniformly distributed to reduce the probability of repetitive and harmful data patterns. Additionally, the allocation of scrambler seeds is controlled to ensure seeds for adjacent physical storage elements are not repetitive or correlated (e.g., seeds do not repeat within the adjacent pages of a memory block).

In some embodiments, codewords within the same XOR stripe are assigned a scrambling seed that is different than scrambling seeds used for codewords stored in adjacent physical storage elements, and each codeword in the XOR stripe may be scrambled with a different seed. In this manner, when one of the codewords within the XOR stripe is decoded, the rest of the codewords' scrambling seed can be derived. When decoding of multiple pages fails, the JLX ECC Scheme 131 may refer to the scrambling seeds for the pages to re-create the pages with errors, as shown in FIGS. 5-8.

Figure 5:
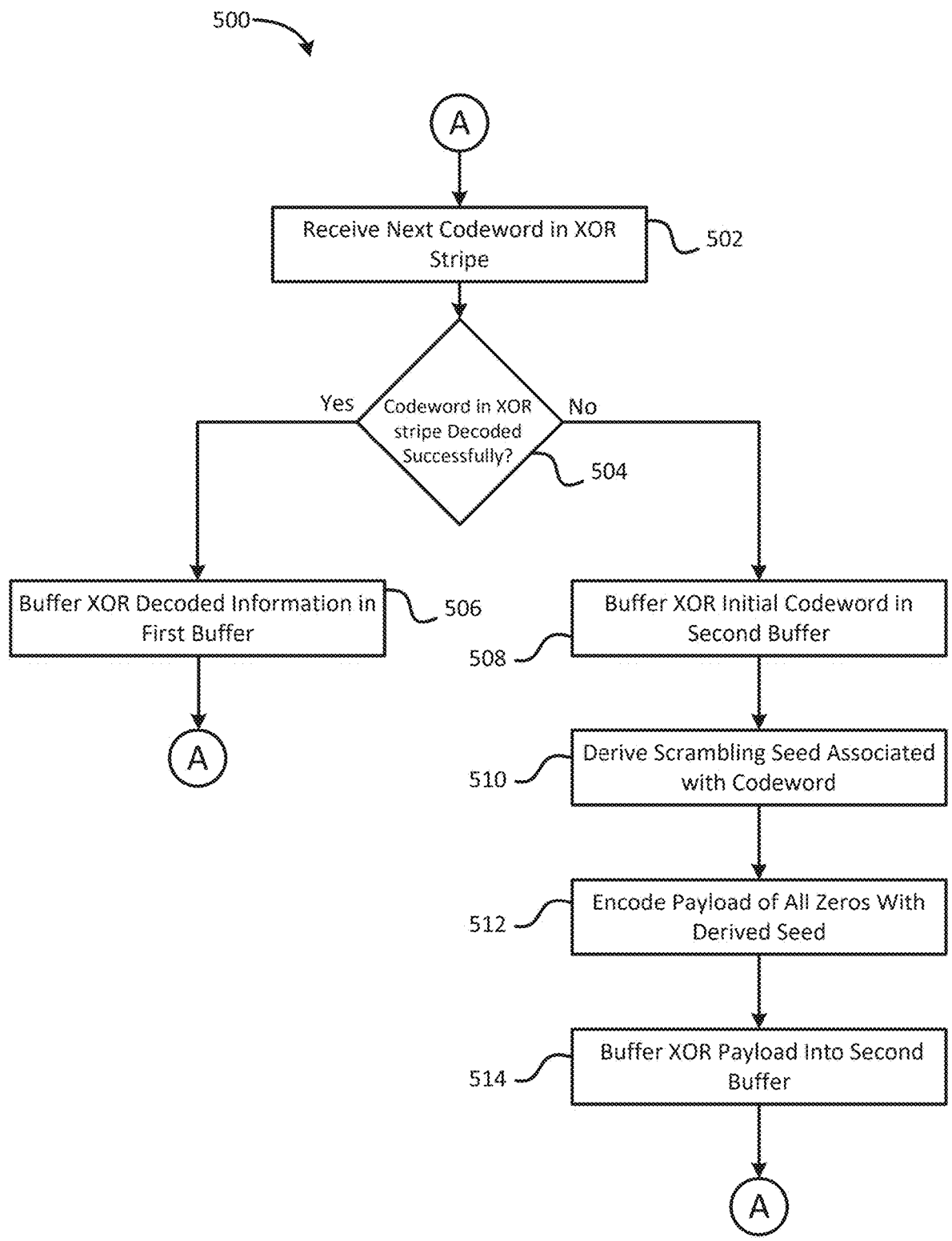
FIG. 5 is a flow chart of an example method for storing data pages in buffers, in accordance with some embodiments of the disclosure.
Figure 6:
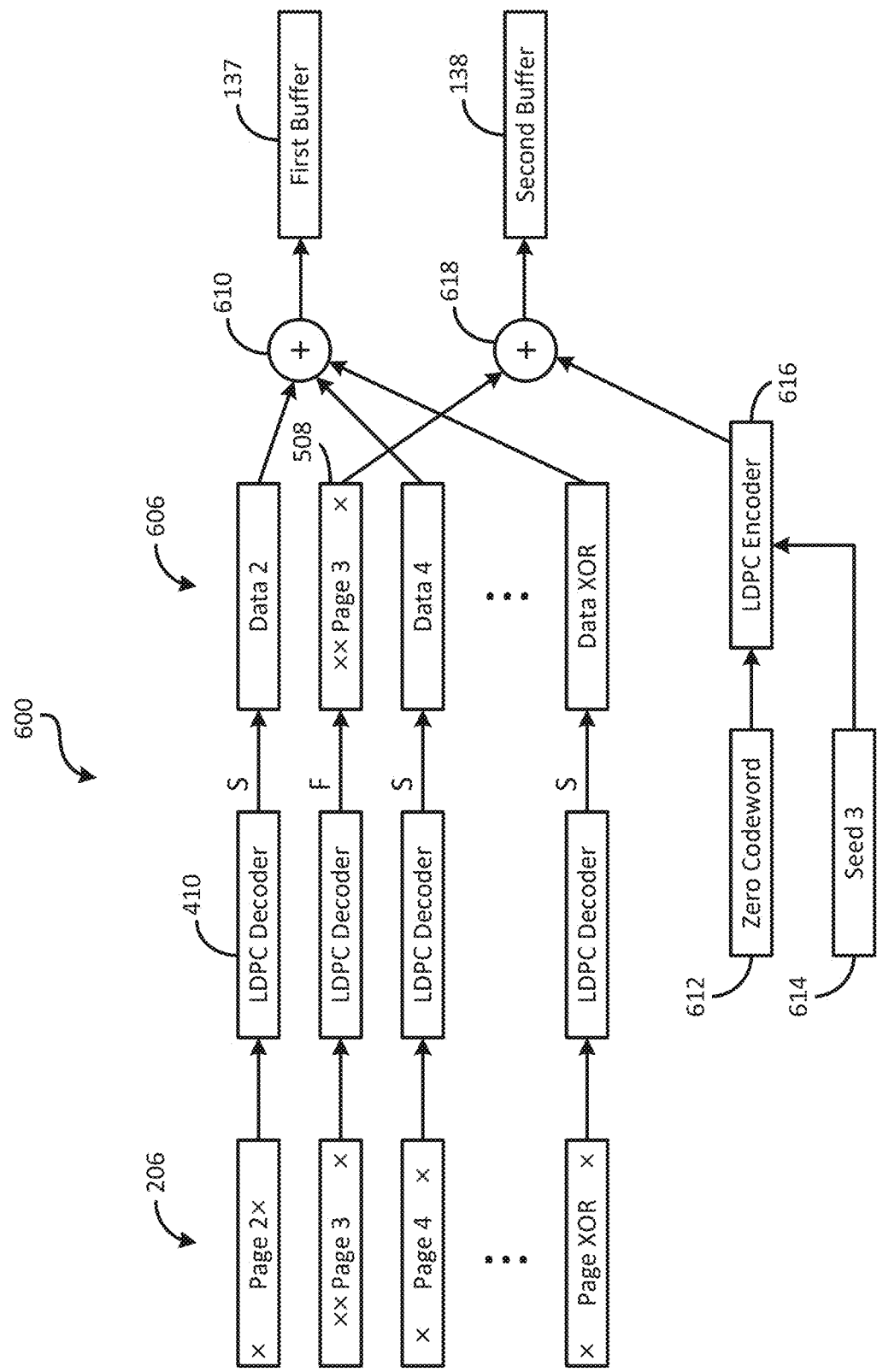
FIG. 6 is an example process of the method of FIG. 5, in accordance with some embodiments of the disclosure.

To correct a codeword that was unsuccessfully decoded using the LDPC ECC Scheme 127, each of the other codewords in the respective XOR stripe may first be separated into buffers based on whether the LDPC ECC Scheme 127 successfully decoded those codewords. FIG. 5 illustrates an example method 500 for storing data pages in buffers. When data is stored in a buffer, an XOR operation may be performed between the data and the buffer such that the buffer remains the same size throughout the buffering process.

FIG. 5 illustrates a block diagram of an example method 500 for storing data pages in buffers based on whether the LDPC ECC Scheme 127 is successful. The data storage device controller 120 may perform the method 500 during decoding of data from the memory 104. In the example method 500, a first codeword (e.g., first page 401) has initially failed to be decoded successfully. The method 500 is described with respect to FIG. 6, which visualizes an example 600 of implementing the method 500.

The method 500 includes receiving the next codeword in the XOR stripe (at step 502). For example, with reference to FIG. 6, a next page of the plurality of data pages 206 is received by the data storage device controller 120.

Returning to FIG. 5, the method 500 includes determining whether the received codeword in the XOR stripe is decoded successfully (at decision step 504). For example, with reference to FIG. 6, the LDPC decoder 410 decodes the plurality of data pages 206 to retrieve a plurality of recovered data pages 606. The decoding by the LDPC decoder 410 may be successful (indicated by an "S") or unsuccessful (indicated by an "F").

When the codeword in the XOR stripe is decoded successfully ("YES" at decision step 504), the method 500 proceeds to step 506 and includes buffering (e.g., storing) the XOR decoded information in a first buffer. In the example 600 of FIG. 6, the decoding of page 2, page 4, and page XOR is successful, resulting in acquisition of data 2, data 4, and data XOR in the plurality of recovered data pages 606. Data 2, Data 4, and Data XOR are buffered into first buffer 137 by a first summing node 610. The summing node 610 may XOR the data being buffered into the first buffer 137 with the first buffer 137.

When the codeword in the XOR stripe is not decoded successfully ("NO" at decision step 504), the method 500 proceeds to step 508 and buffers the XOR codeword in a second buffer. In the example 600 of FIG. 6, decoding of page 3 has failed, resulting in an errored page 608. The errored page 608 is buffered into second buffer 138 by a second summing node 618. The summing node 618 may XOR the errored page 608 with the second buffer 138.

The method 500 includes deriving a scrambling seed associated with the received codeword (at step 510). For example, when decoding a codeword fails, the data storage device controller 120 derives the scrambling seed associated with the failed codeword using a deterministic function that is based on the codewords that were corrected successfully. In the example 600 of FIG. 6, the data storage device controller 120 determines a scrambling seed 614 associated with the errored page 608 (e.g., seed 3 associated with page 3).

The method 500 includes encoding a payload of all zeros with the derived seed (at step 512). For example, as shown in example 600, the scrambling seed 614 is encoded with a zero codeword 612 by LDPC encoder 616, resulting in an encoded payload.

The method 500 includes buffering the encoded payload into a second buffer (at step 514). For example, the encoded payload, which includes the scrambling seed 614 associated with the errored page 608, is buffered into the second buffer 138 by the second summing node 618. The summing node 618 may XOR the encoded payload from the LDPC encoder 616 with the second buffer 138.

Once the decoded information is stored in the first buffer 137 (at step 506), or once the encoded payload is stored in the second buffer 138 (at step 514), the method 500 returns to step 502 and receives the next codeword in the XOR stripe. The method 500 continues until each codeword is stored in either the first buffer 137 or the second buffer 138. Once each codeword is stored in either the first buffer 137 or the second buffer 138, the data storage device controller 120 may proceed to the method 700 of FIG. 7.

Figure 7:
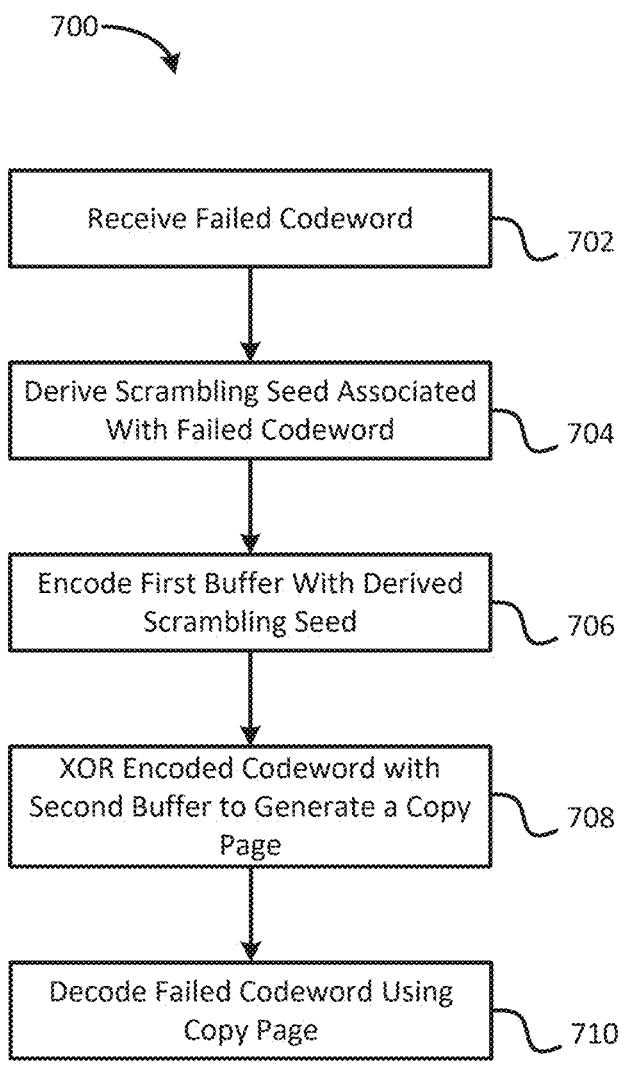
FIG. 7 is a flow chart of an example method for correcting an errored page, in accordance with some embodiments of the disclosure.
Figure 8:
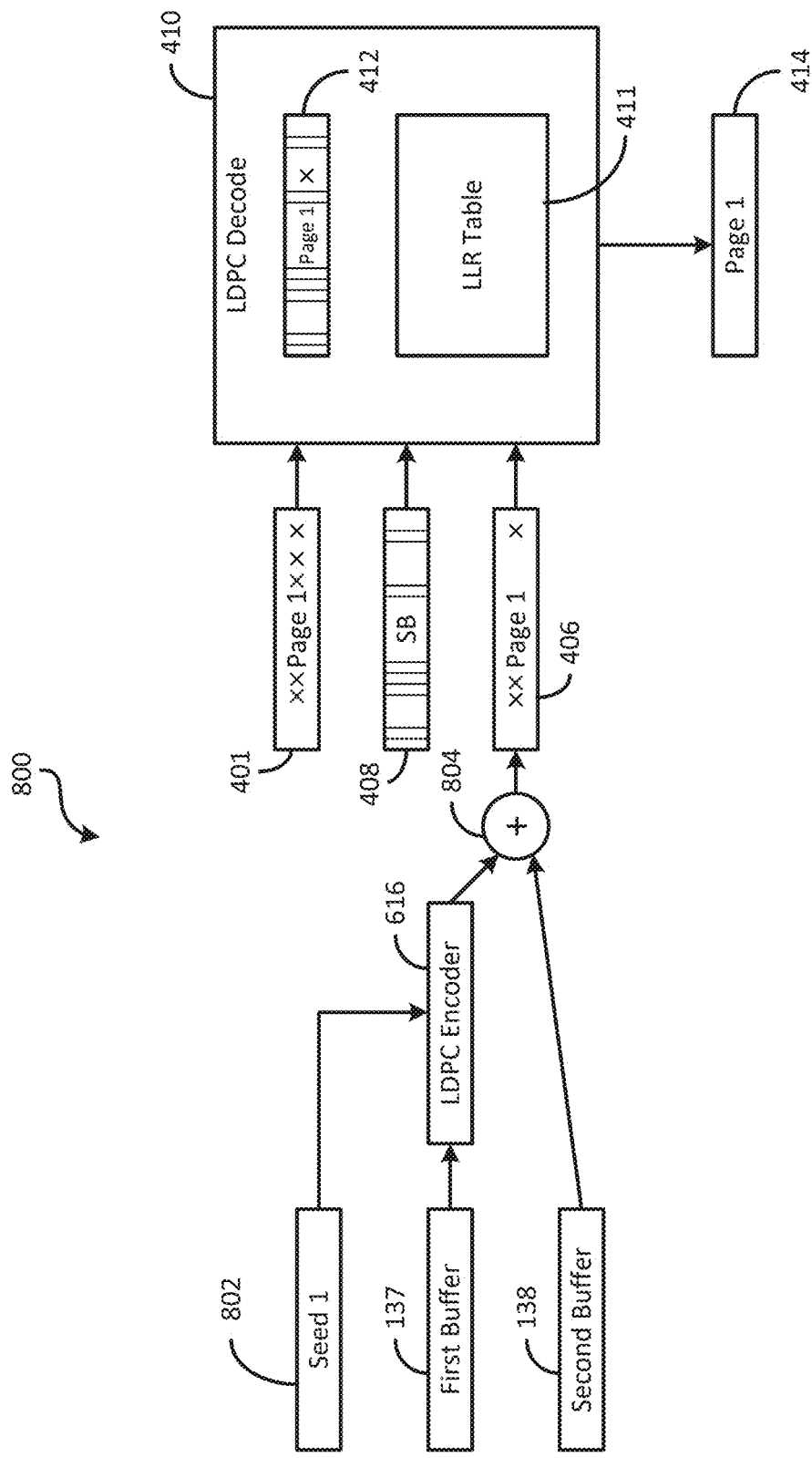
FIG. 8 is an example process of the method of FIG. 7, in accordance with some embodiments of the disclosure.

FIG. 7 illustrates a block diagram of a method 700 for correcting an errored page. The data storage device controller 120 may perform the method 500 during decoding of data from the memory 104. The method 700 may be performed by the data storage device controller 120 immediately following the method 500. The method 700 is described with respect to FIG. 8, which visualizes an example 800 of implementing the method 700.

The method 700 includes receiving the failed codeword (at step 702). For example, the data storage device controller 120 receives the first page 401.

The method 700 includes deriving a scrambling seed associated with the failed codeword (at step 704). For example, the data storage device controller 120 derives the scrambling seed associated with the failed codeword using a deterministic function that is based on the codewords that were corrected successfully. In the example 800 of FIG. 8, the data storage device controller 120 determines a scrambling seed 802 associated with the first page 401 (e.g., seed 1 associated with page 1).

The method 700 includes encoding the first buffer 137 with the derived scrambling seed associated with the failed codeword (at step 706). For example, as shown in example 800 of FIG. 8, the scrambling seed 802 is encoded with the contents of the first buffer 137 by the LDPC encoder 616. In this manner, the scrambling seed 802 associated with the first page 401 is encoded with the data of codewords that were successfully decoded (at step 504 of method 500).

The method 700 includes performing an XOR operation between the encoded codeword from step 706 and the second buffer 138, thereby generating a copy page (at step 708). As shown in example 800 of FIG. 8, the XOR operation between the encoded codeword from the LDPC encoded 616 and the second buffer 138 generates the copy page 406 of the first page 401.

The method 700 includes decoding the failed codeword using the copy page (at step 710). For example, as previously described with respect to FIG. 4, the LDPC decoder 410 receives the first page 401, the soft bit page 408, and the copy page 406 as inputs and generates a corrected first page 414.

Pseudocode providing an example of implementing the method 500 and method 700 is shown in FIG. 9. The methods 500, 700 may be repeated for each failed codeword during decoding of data from the memory 104. Once a failed codeword is successfully recovered, the recovered recreation of the codeword may then be used as an input for recovering additional failed codewords. FIG. 10 provides an example mathematical proof of correctness for the JLX ECC Scheme 131 of FIGS. 5-8.

Figure 11:
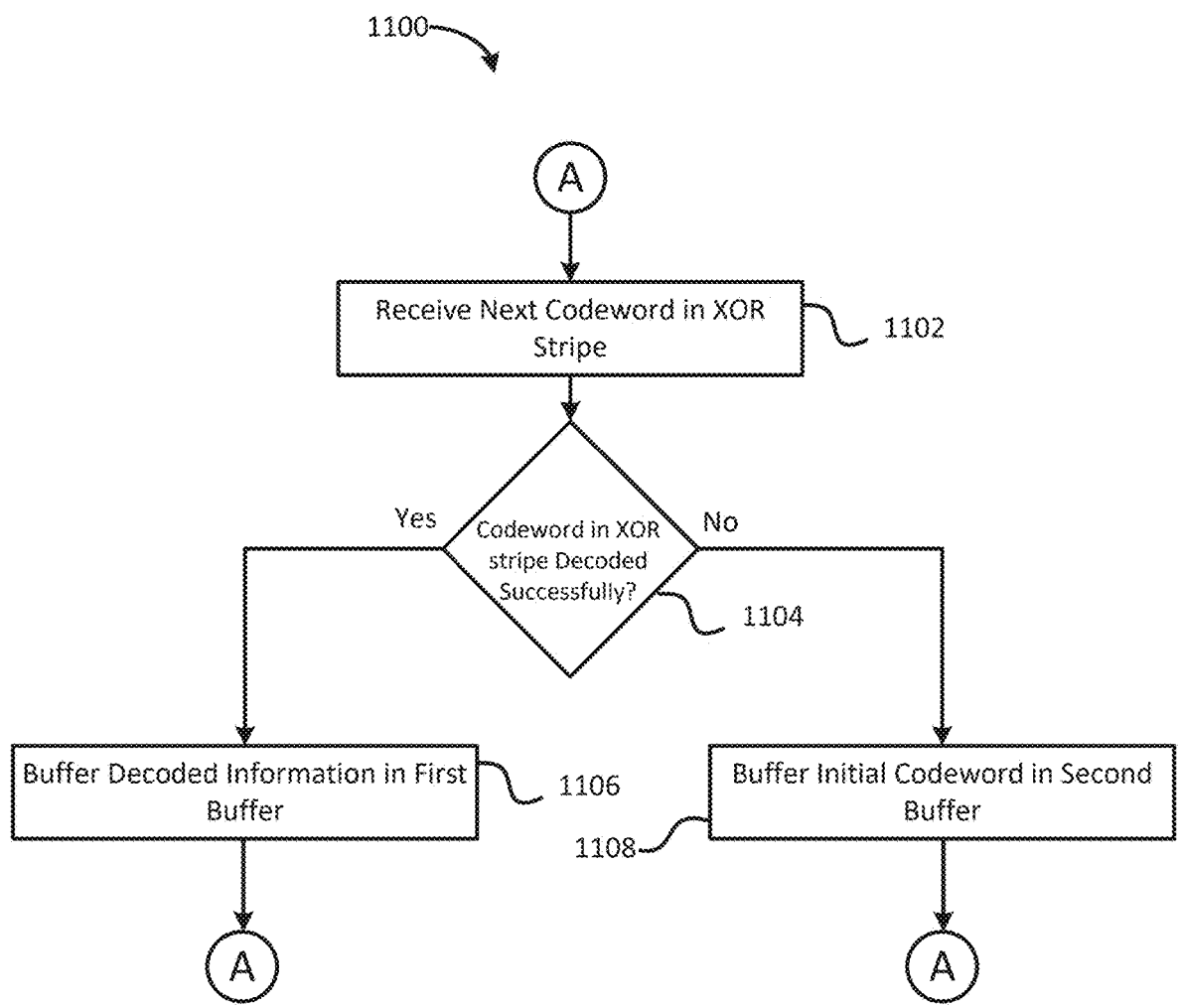
FIG. 11 is a flow chart of another example method for storing data pages in buffers, in accordance with some embodiments of the disclosure.
Figure 12:
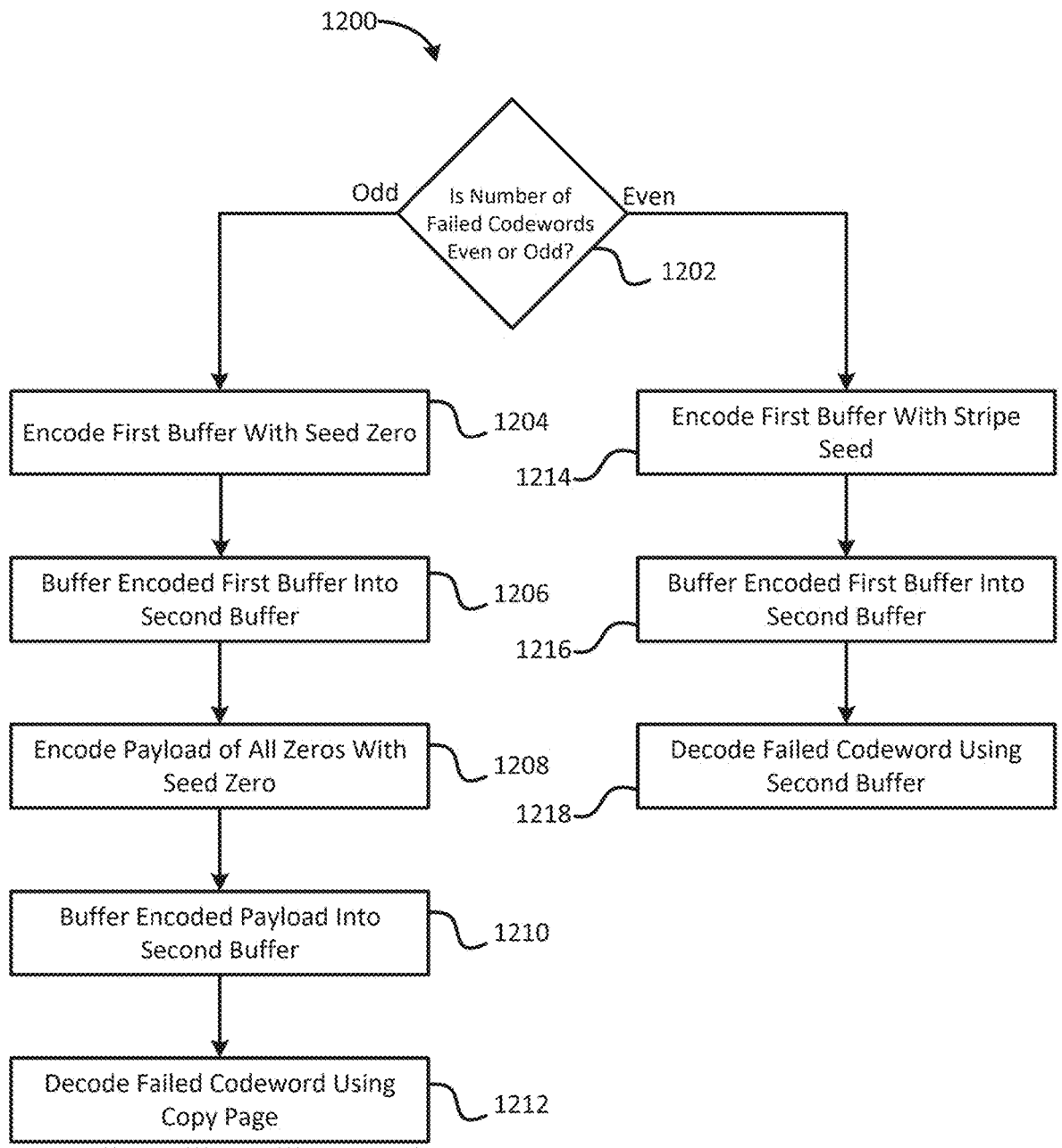
FIG. 12 is a flow chart of another example method for correcting an errored page, in accordance with some embodiments of the disclosure.

In the example of FIGS. 5-8, codewords within the same XOR stripe are assigned a scrambling seed that is different than scrambling seeds used for adjacent physical storage elements. The scrambling seeds may be related through a function. However, in other examples, the XOR stripe spans multiple dies that are not adjacent, and therefore do not have adverse effects from a pattern dependency. Accordingly, the same scrambling seed may be used for each codeword in the XOR stripe. FIGS. 11-12 provide methods for recovering failed codewords when each codeword is scrambled with the same scrambling seed. In the examples described herein, cyclic redundancy check (CRC) may be implemented to validate that the decoded information is the same as the encoded information. In the examples of FIGS. 11-12, the CRC may be designed such that all-zero information does not result in an all-zero codeword.

First, FIG. 11 illustrates a block diagram of an example method 1100 for storing data pages in buffers based on whether the LDPC ECC Scheme 127 is successful. The data storage device controller 120 may perform the method 1100 during decoding of data from the memory 104. In the example method 1100, a first codeword (e.g., first page 401) has initially failed to be decoded successfully.

The method 1100 includes receiving the next codeword in the XOR stripe (at step 1102). The method 1100 includes determining whether the received codeword in the XOR stripe is decoded successfully (at decision step 504).

When the codeword in the XOR stripe is decoded successfully ("YES" at decision step 1104), the method 1100 proceeds to step 1106 and includes buffering (e.g., storing) the decoded information in a first buffer. For example, the data storage device controller 120 performs an XOR operation between the decoded information and the first buffer. When the codeword in the XOR stripe is not decoded successfully ("NO" at decision step 1104), the method 1100 proceeds to step 1108 and buffers the failed codeword in a second buffer. For example, the data storage device controller 120 performs an XOR operation between the decoded information and the second buffer.

Once the decoded information is stored in the first buffer (at step 1106), or once the codeword is stored in the second buffer (at step 1108), the method 1100 returns to step 1102 and receives the next codeword in the XOR stripe. The method 500 continues until each codeword is stored in either the first buffer or the second buffer. When a codeword fails to decode, its seed is derived using a deterministic function that is based on the codewords that were corrected successfully. A zero codeword is encoded using this derived seed and is also buffered to the second buffer, therefore "cancelling" the CRC.

FIG. 12 illustrates a block diagram of an example method 1200 for correcting an errored page. The method 1200 may be performed by the data storage device controller 120 once the number of failed codewords within a XOR stripe is established, as determined based on the size of the first buffer and the second buffer in method 1100. Depending on whether the number of failed codewords is even or on, a determination is performed. The determination is associated with the CRC design that dictates the "all zero" information does not result in an "all zero" CRC. As such, the parity for this information and the CRC is also not zero, and is generated along the "odd number" path. While in the "even number" path, this parity is XORed between all the even number of failed codewords and cancelled. In this "odd number" path, the CRC and parity of an "all zero" information payload is recreated to cancel the parity.

The method 1200 includes determining whether the number of failed codewords is even or odd (at step 1202). When the number of failed codewords is odd ("ODD" at step 1202), the method 1200 proceeds to step 1204. When the number of failed codewords is even ("EVEN" at step 1202), the method 1200 proceeds to step 1214.

First, when the number of failed codewords is odd, the method 1200 includes encoding the first buffer with a seed zero (at step 1204). For example, a scrambling seed may be associated with an all zero codeword. The seed zero is encoded with the first buffer by the LDPC encoder 616, thereby generating an encoded first buffer.

The method 1200 includes buffering the encoded first buffer into the second buffer (at step 1206). For example, the data storage device controller 120 performs an XOR operation between the encoded first buffer and the second buffer.

The method 1200 includes encoding a payload of all zeros with the seed zero (at step 1208). For example, the seed zero is encoded with a zero codeword by LDPC encoder 616, resulting in an encoded payload.

The method 1200 includes buffering the encoded payload into the second buffer (at step 1210). For example, the data storage device controller 120 performs an XOR operation between the encoded payload from step 1208 and the second buffer, thereby generating the copy page 406.

The method 1200 includes decoding the failed codeword using the copy page (at step 710). For example, as previously described with respect to FIG. 4, the LDPC decoder 410 receives the first page 401, the soft bit page 408, and the copy page 406 as inputs and generates a corrected first page 414.

Returning to step 1202, when the number of failed codewords is even, the method 1200 includes encoding the first buffer with the stripe seed (at step 1214). For example, a scrambling seed is associated with all codewords within the XOR stripe. The stripe seed is encoded with the first buffer by the LDPC encoder 616, thereby generating an encoded first buffer.

The method 1200 includes buffering the encoded first buffer into the second buffer (at step 1216). For example, the data storage device controller 120 performs an XOR operation between the encoded first buffer and the second buffer, thereby generating the copy page 406.

The method 1200 includes decoding the failed codeword using the copy page (at step 1218). For example, as previously described with respect to FIG. 4, the LDPC decoder 410 receives the first page 401, the soft bit page 408, and the copy page 406 as inputs and generates a corrected first page 414.

Pseudocode providing an example of implementing the method 1100 and the method 1200 shown in FIG. 13. FIG. 14A provides an example mathematical proof of correctness for the JLX ECC Scheme 131 of FIGS. 11-12 when the number of failed codewords is even. FIG. 14B provides an example mathematical proof of correctness for the JLX ECC Scheme 131 of FIGS. 11-12 when the number of failed codewords is odd.

Figure 15:
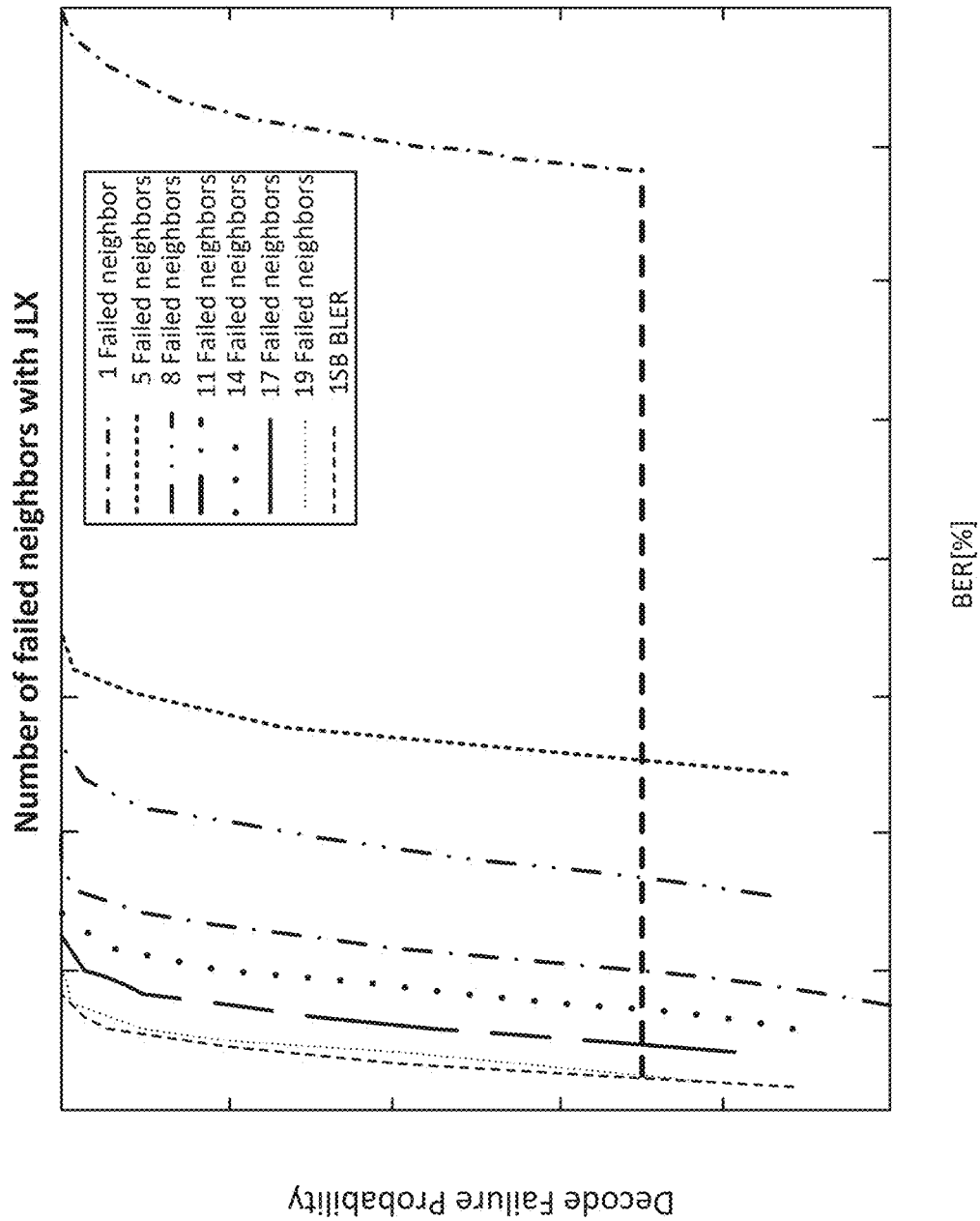
FIG. 15 is a graph illustrating the probability of a decode failure for a given number of failed neighboring codewords at a given bit error rate, in accordance with some embodiments of the disclosure.
Figure 16:
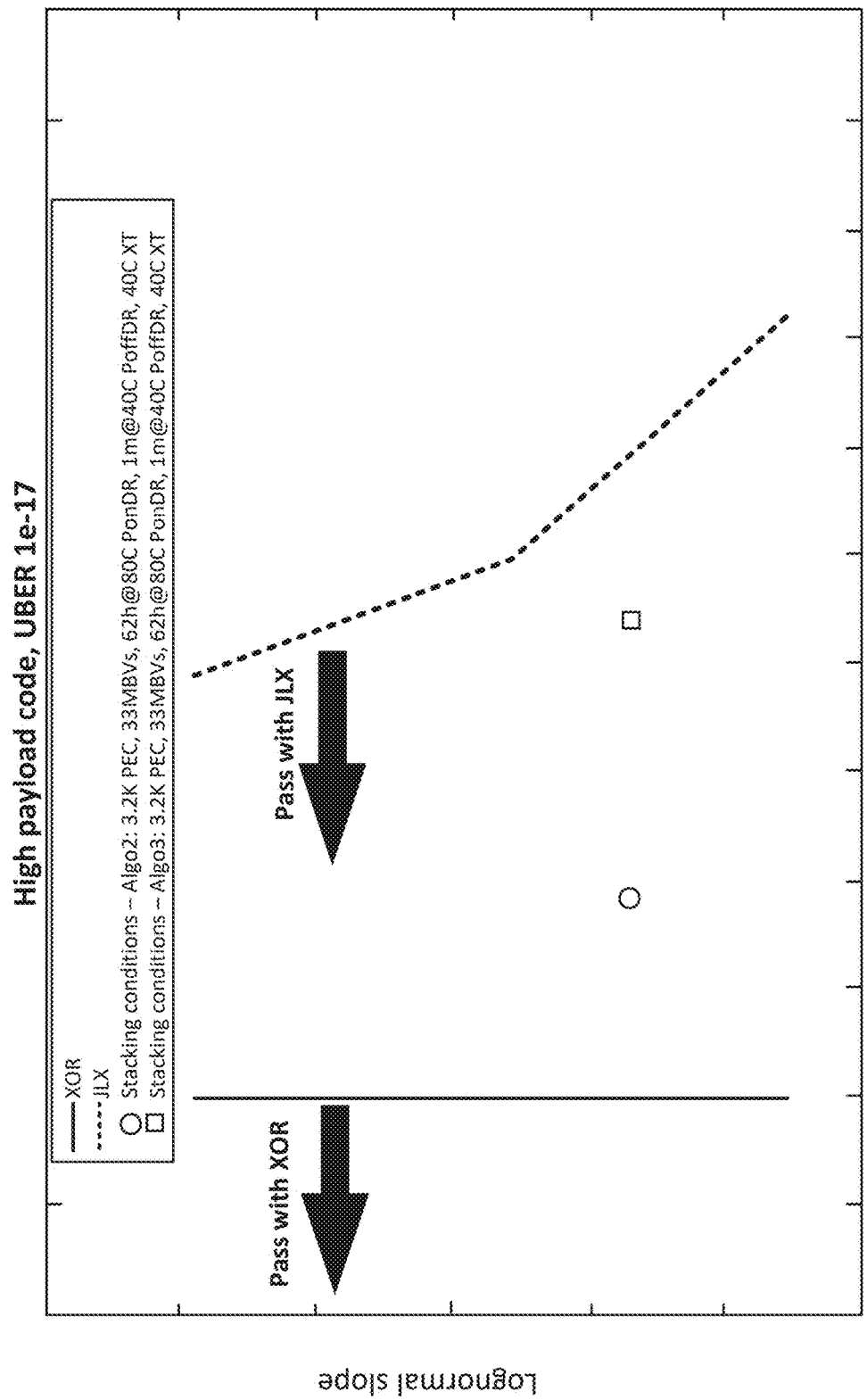
FIG. 16 is a graph illustrating correctable logarithmic BER distributions, in accordance with some embodiments of the disclosure.

Accordingly, embodiments described herein provide for increased correction success by the ECC engine 126. FIG. 15 provides a graph illustrating the probability of a decode failure for a given number of failed neighboring codewords at a given bit error rate (BER). In the example of FIG. 15, the XOR stripe length is 32, the code length is 4744 bits, the payload size is 4128+8 bits, and the parity size is 608 bits. Additionally, FIG. 16 provides a graph illustrating correctable logarithmic BER distributions using only the XOR ECC Scheme 129 and using the JLX ECC Scheme 131.

JLX Mathematical Analysis

A mathematical analysis of the JLX ECC Scheme 131 described herein is provided below, showing the theoretical benefits of such embodiments. The analysis described herein assumes a simplistic degraded decoder that fails with a probability of 100% for any BER above an LDPC correction capability. Additionally, the analysis assumes a "hard" page combining (instead of a soft LLR combining by an LLR table).

Figure 17:
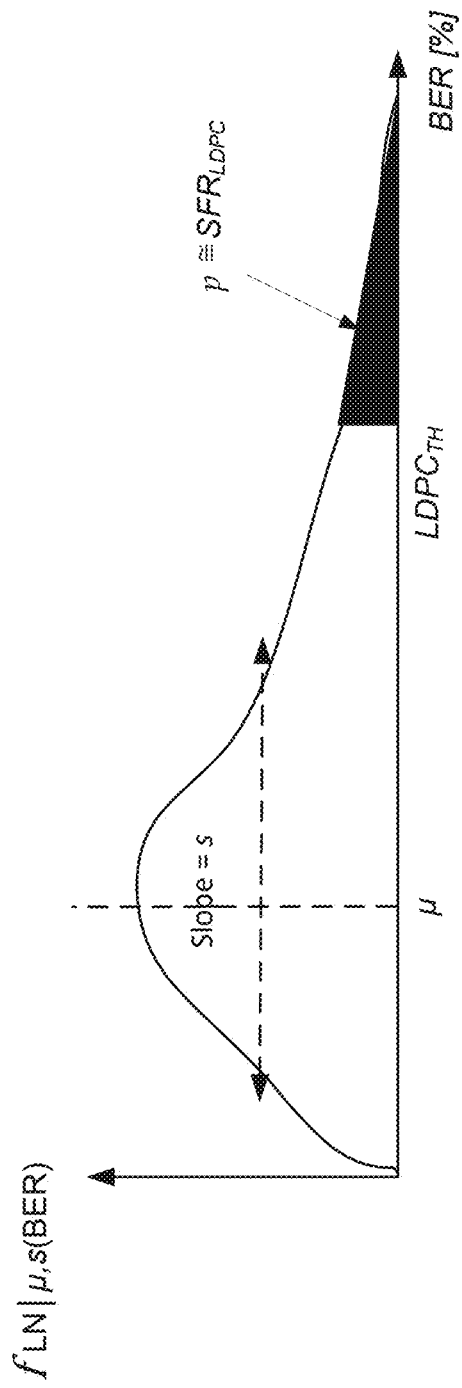
FIG. 17 is a graph illustrating an example bit error rate distribution, in accordance with some embodiments of the disclosure.

First, the success fail rate of the LDPC ECC Scheme 127 ($SFR_{LDPC}$) is defined according to Equation (1) and with respect to the BER distribution shown in FIG. 17:

$$SFR_{LDPC} = \int_{BER_1} f_{LN|\mu,s}(BER_1) \cdot Pr(\text{Decode fail} | BER_1) \leq \quad (1)$$

$$\int_{BER_1 > LDPC_{TH}} f_{LN|\mu,s}(BER_1)$$

Where:
LDPC$_{TH}$—LDPC correction capability;
N—Length of the XOR stripe; and
BER$_i${=1, ..., N} drawn from a Log Normal BER distribution $f_{LN|\mu,s}$ with median BER $\mu$ and slope s The success fail rate of the JLX ECC Scheme 131 ($SFR_{JLX}$) is defined according to Equation (2):

$$SFR_{JLX} \leq \int_{BER_1 > LDPC_{TH}} f_{LN|\mu,s}(BER_1) \int\int\int_{BER_2,...,BER_N} f_{LN|\mu,s}(BER_2) \quad (2)$$

$$\cdot ... \cdot f_{LN|\mu,s}(BER_N) \cdot I[BER_{combined}(BER_1, BER_2, ..., BER_N) >$$

$$LDPC_{TH}]$$

Where:

$$I[x] = \begin{cases} 1 & x \text{ True} \\ 0 & x \text{ False} \end{cases}$$

In Equation (2), the first integral represents the probability of the target page decoding failed, and the second integral represents the probability of the JLX recovery failing.

Figure 18:
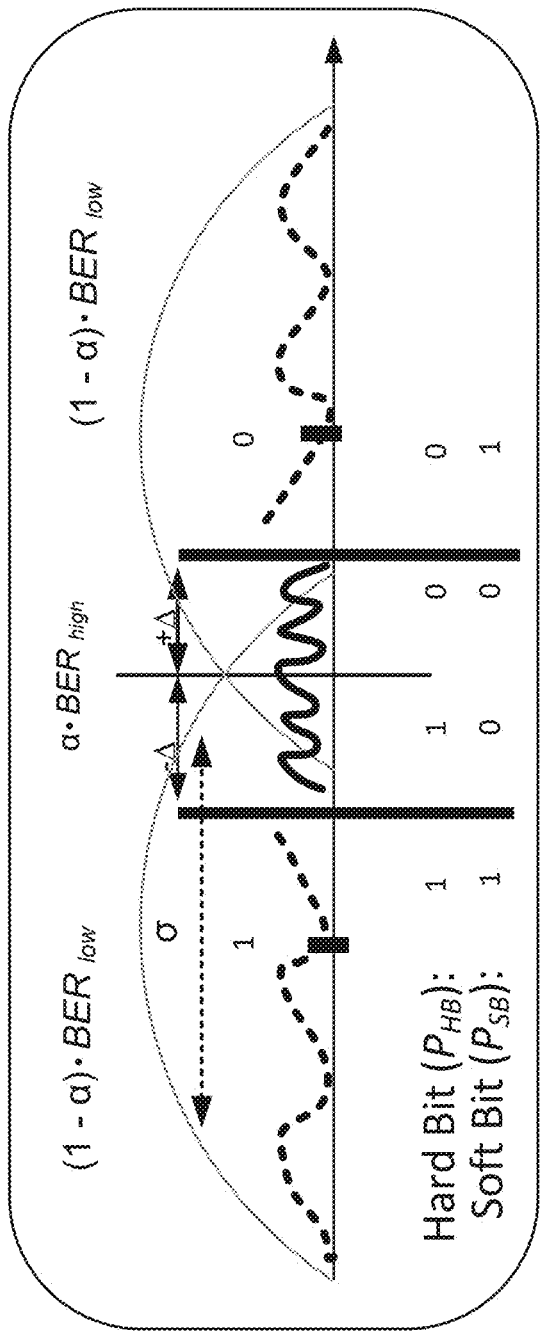
FIG. 18 is a graph illustrating an example of hard bits and soft bits, in accordance with some embodiments of the disclosure.

Next, the BER is identified based on the use of hard bits and soft bits (see FIG. 18). Assume that the target page exhibits a BER of BER$_1$, and that the target page has a normal cell voltage distribution with standard deviation of STD=$\sigma$, where $$\sigma = \frac{1}{2Q^{-1}(BER_1)} \text{ and } Q(x) = \int_x^\infty \frac{1}{\sqrt{2\pi}} e^{-v^2/2} dv.$$

Next, assuming a soft bit page of the target page is generated by reading at $\pm\Delta$ around the hard bit read level, BER$_1$ is derived according to Equation (3):

$$BER_1 = \alpha \cdot BER_{high} + (1-\alpha) \cdot BER_{low} = Q\left(\frac{1}{2\sigma}\right) \quad (3)$$

Where:

$$\alpha = Q\left(\frac{0.5-\Delta}{\sigma}\right) - Q\left(\frac{0.5+\Delta}{\sigma}\right);$$

$$BER_{high} = \frac{Q\left(\frac{0.5}{\sigma}\right) - Q\left(\frac{0.5+\Delta}{\sigma}\right)}{\alpha}; \text{ and}$$

$$BER_{low} = \frac{Q\left(\frac{0.5+\Delta}{\sigma}\right)}{1-\alpha}.$$

The BER of the XOR ECC Scheme 129 ($BER_{XOR}$) is derived according to Equation (4):

$$BER_{XOR}(BER_2, \ldots, BER_N) \leq \frac{1}{2} \cdot \left(1 - \prod_{\substack{j=2,\ldots,N \\ BER_j > LDPC\_TH}} (1 - 2 \cdot BER_j)\right) \leq \quad (4)$$

$$\frac{1 - (1 - 2 \cdot \max(BER_2, \ldots, BER_N))^{\Sigma_{j=2,\ldots,N} I(BER_j > LDPC_{TH})}}{2}$$

assuming that only pages with $BER>LDPC_{TH}$ contribute to the $BER_{XOR}$ and assumes maximal page BER for all $t=\Sigma_{j=2,\ldots,N}\, I(BER_j>LDPC_{TH})$ failing pages, where t is the number of additional failing pages. The combined BER is derived according to Equation (5):

$$BER_{combined}(BER_1, BER_2, \ldots, BER_N \mid \Delta) = \alpha \cdot BER_{XOR}(BER_2, \quad (5)$$

$$\ldots, BER_N) + (1-\alpha) \cdot BER_{low} \leq \alpha \cdot \frac{1-(1-2 \cdot BER_{max})^t}{2} + (1-\alpha) \cdot$$

$$BER\_low$$

Figure 19:
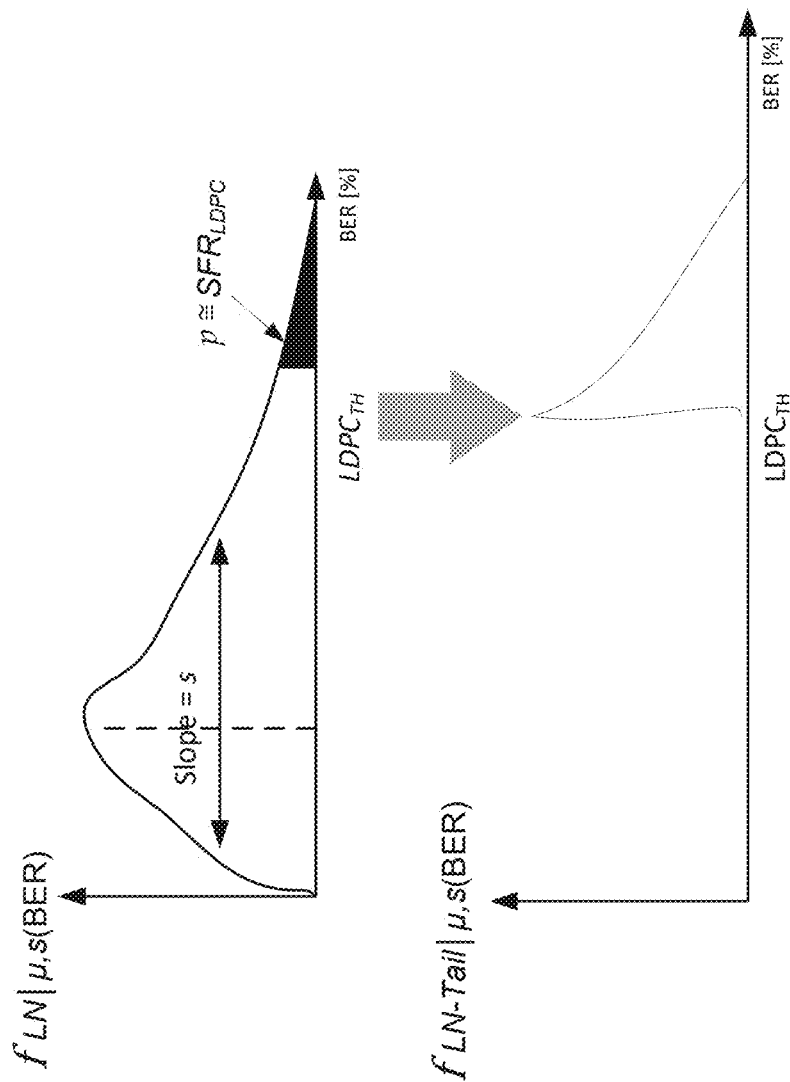
FIG. 19 is a graph illustrating an example LN bit error rate distribution, in accordance with some embodiments of the disclosure.

Next, some auxiliary probability density functions are defined based on the LN BER distribution $f_{LN\mid\mu,s}(BER)$, shown in FIG. 19. The area of p shown in FIG. 19 is defined by Equation (6):

$$p = \int_{BER>LDPC_{TH}} f_{LN\mid\mu,s}(BER) \quad (6)$$

The distribution of BER given an LDPC failure is defined according to Equation (7):

$$f_{LN-Tail\mid\mu,s}(BER) = \begin{cases} 0 & BER < LDPC_{TH} \\ \dfrac{f_{LN\mid\mu,s}(BER)}{\int_{BER \geq LDPC_{TH}} f_{LN\mid\mu,s}(BER)} & BER \geq LDPC_{TH} \end{cases} \quad (7)$$

The cumulative distribution of BER given an LDPC failure is equal to the probability that tail ber is below a BER value given an LDPC failure is defined according to Equation (8):

$$F_{LN-Tail\mid\mu,s}(BER) = Pr(ber \leq BER) = \int_{LDPC_{TH}}^{BER} f_{LN-Tail\mid\mu,s}(ber) \quad (8)$$

The probability that the maximal tail ber over t failing pages is lower than the BER is defined according to Equation (9):

$$F_{Max-LN-Tail\mid\mu,s}(BER, t) = Pr(\max\{ber_1, \ldots, ber_t\} \leq BER) = Pr(ber_1 \leq \quad (9)$$

$$BER) \cdot \ldots \cdot Pr(ber_t \leq BER) = F_{LN-Tail\mid\mu,s}(BER)^t$$

The probability that maximal tail ber over t failing pages is equal to the BER, as defined according to Equation (10):

$$f_{Max-LN-Tail\mid\mu,s}(BER, t) = Pr(\max\{ber_1, \ldots, ber_t\} = BER) = \quad (10)$$

$$\frac{dF_{Max-LN-Tail\mid\mu,s}(BER)}{dBER} = \frac{dF_{LN-Tail\mid\mu,s}(BER)^t}{dBER}$$

Next, the n-dimensional integral that computes $SFR_{JLX}$ is reduced and bound into a computationally feasible two-dimensional integral. The n-dimensional integral is bound by re-enumerating the BER events according to cases of $t=1, 2, \ldots, N-1$ additional failing pages. Next, the $BER_{combined}$ upper bound (based on number of failing pages t and maximal BER over them) is used, as shown by Equation (11):

$$SFR_{JLX} \leq \int_{BER_1 > LDPC_{TH}} f_{LN\mid\mu,s}(BER_1) \int \int \int_{BER_2, \ldots, BER_N} \quad (11)$$

$$f_{LN\mid\mu,s}(BER_2) \cdot \ldots \cdot f_{LN\mid\mu,s}(BER_N) \cdot I[BER_{combined}(BER_1, BER_2, \ldots,$$

$$BER_N) > LDPC_{TH}] \leq \int_{BER_1 > LDPC_{TH}} f_{LN\mid\mu,s}(BER_1) \sum_{t=1,\ldots N-1}$$

$$\binom{N-1}{t} \cdot p^t \cdot (1-p)^{N-1-t} \cdot \int_{BER_{max}} f_{Max-LN-Tail\mid\mu,s}(BER_{max}, t) \cdot$$

$$I[BER_{combined}(BER_1, BER_{max}) > LDPC_{TH}] \leq \int_{BER_1 > LDPC_{TH}} f_{LN\mid\mu,s}$$

$$(BER_1) \sum_{t=1,\ldots,N-1} \binom{N-1}{t} \cdot p^t \cdot (1-p)^{N-1-t} \cdot \int_{BER_{max}} f_{Max-LN-Tail\mid\mu,s}$$

$$(BER_{max}, t) \cdot I\left[\left(\alpha \cdot \frac{1-(1-2 \cdot BER_{max})^t}{2} + (1-\alpha) \cdot BER\_low\right) > LDPC\_TH\right]$$

It is to be understood that the above description is intended to be illustrative and not restrictive. Many embodiments and applications other than the examples provide would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage device comprising:
a memory for storing a plurality of codewords; and
a data storage device controller coupled to the memory, the controller including a processor and a controller memory storing a set of instructions that, when executed by the processor, instruct the controller to:
detect, during decoding of the plurality of codewords, at least two failed codewords that failed to be decoded;
determine scrambling seeds associated with the at least two failed codewords;
perform a joint low density parity check and exclusive-or (JLX) operation using the scrambling seeds associated with the at least two failed codewords; and
recover at least one of the at least two failed codewords from the JLX operation.

2. The data storage device of claim 1, further comprising a low density parity check decoder, and wherein the plurality of codewords includes a first failed codeword and a set of second codewords, and wherein to perform the JLX operation the set of instructions instruct the controller to:
perform an exclusive-or operation on the set of second codewords to generate a copy of the first failed codeword, wherein the copy of the first failed codeword includes different errors than the first failed codeword; and
recover, using the low density parity check decoder, the first failed codeword using the copy of the first failed codeword.

3. The data storage device of claim 2, wherein the copy of the first failed codeword is used as a soft bit input to the low density parity check decoder.

4. The data storage device of claim 2, wherein the set of second codewords includes a second failed codeword, and wherein the copy of the first failed codeword includes the same errors as the second failed codeword.

5. The data storage device of claim 4, wherein to perform the JLX operation the set of instructions instruct the controller to:
recover the second failed codeword using the recovered first failed codeword.

6. The data storage device of claim 1, further comprising a first buffer and a second buffer, and wherein the plurality of codewords includes a first failed codeword and a set of second codewords, and wherein the set of instructions instruct the controller to:
buffer, during decoding of the set of second codewords, data from successfully decoded codewords in the first buffer; and
buffer, during decoding of the set of second codewords, failed codewords in the second buffer.

7. The data storage device of claim 6, and wherein to perform the JLX operation the set of instructions instruct the controller to:
derive a first scrambling seed associated with the failed codewords; and
buffer the first scrambling seed in the second buffer.

8. The data storage device of claim 7, wherein each codeword of the plurality of codewords is associated with a different scrambling seed.

9. The data storage device of claim 7, wherein each codeword of the plurality of codewords is associated with the same scrambling seed.

10. The data storage device of claim 7, wherein to perform the JLX operation the set of instructions instruct the controller to:
encode the first scrambling seed with a payload of zero values.

11. The data storage device of claim 7, wherein to perform the JLX operation the set of instructions instruct the controller to:
derive a second scrambling seed associated with the first failed codeword;
encode the data stored in the first buffer with the second scrambling seed to generate an encoded data; and
perform an exclusive-or operation on the encoded data and the first scrambling seed stored in the second buffer to generate a copy of the first failed codeword.

12. The data storage device of claim 11, further comprising a low density parity check decoder, and wherein to perform the JLX operation the set of instructions instruct the controller to:
recover, using the low density parity check decoder, the first failed codeword using the copy of the first failed codeword.

13. A method comprising:
detecting, during decoding of a plurality of codewords by a storage controller executing decoding firmware, at least two failed codewords that failed to be decoded;
determining, with the storage controller, scrambling seeds associated with the at least two failed codewords;
performing, with the storage controller, a joint low density parity check and exclusive-or (JLX) operation using the scrambling seeds associated with the at least two failed codewords; and
recovering, with the storage controller, at least one of the at least two failed codewords from the JLX operation.

14. The method of claim 13, wherein the plurality of codewords includes a first failed codeword and a set of second codewords, and wherein performing the JLX operation includes:
performing, with the storage controller, an exclusive-or operation on the set of second codewords to generate a copy of the first failed codeword, wherein the copy of the first failed codeword includes different errors than the first failed codeword; and
recovering, with the storage controller using a low density parity check decoder, the first failed codeword using the copy of the first failed codeword.

15. The method of claim 14, wherein the set of second codewords includes a second failed codeword, and wherein the copy of the first failed codeword includes the same errors as the second failed codeword.

16. The method of claim 15, wherein performing the JLX operation includes:
recovering, with the storage controller, the second failed codeword using the recovered first failed codeword.

17. The method of claim 13, wherein the plurality of codewords includes a first failed codeword and a set of second codewords, and wherein the method includes:

buffering, with the storage controller and during decoding of the set of second codewords, data from successfully decoded codewords in a first buffer; and buffering, with the storage controller and during decoding of the set of second codewords, failed codewords in a second buffer.

18. The method of claim 17, wherein performing the JLX operation includes:

deriving, with the storage controller, a first scrambling seed associated with the failed codewords; and buffering, with the storage controller, the first scrambling seed in the second buffer.

19. The method of claim 18, wherein performing the JLX operation includes:

deriving, with the storage controller, a second scrambling seed associated with the first failed codeword;

encoding, with the storage controller, the first buffer with the second scrambling seed to generate an encoded buffer; and performing, with the storage controller, an exclusive-or operation between the encoded buffer and the second buffer to generate a copy of the first failed codeword.

20. A memory device comprising:

a memory for storing a plurality of codewords; and a controller coupled to the memory, wherein the controller is configured to perform a joint low density parity check and exclusive-or (JLX) operation using a scrambling seed derived by the controller based on successfully-corrected codewords and associated with a failed codeword of the plurality of codewords, to recover the failed codeword when at least two codewords of the plurality of codewords fail during decoding.

* * * * *